United States Patent [19]

Itoh et al.

[11] 3,886,516
[45] May 27, 1975

[54] SEAT BELT OPERATION DETECTOR

[75] Inventors: Masaru Itoh; Kosaku Uota, both of Himeji, Japan

[73] Assignee: Mitsubishi Denki Kabushiki Kaisha, Japan

[22] Filed: July 17, 1973

[21] Appl. No.: 380,005

[30] Foreign Application Priority Data
July 25, 1972 Japan.............................. 47-74507

[52] U.S. Cl............ 340/52 E; 340/278; 307/10 SB; 180/82 C
[51] Int. Cl............................................. B60r 21/10
[58] Field of Search ....... 340/52 E, 278; 307/10 SB; 180/82 C; 200/61.58 B

[56] References Cited
UNITED STATES PATENTS
3,742,448   6/1973   Motz ................................. 340/52 E
3,748,640   7/1973   Sardo ................................ 340/52 E
3,757,293   9/1973   Petersen ........................... 340/52 E

*Primary Examiner*—Alvin H. Waring
*Attorney, Agent, or Firm*—Oblon, Fisher, Spivak, McClelland & Maier

[57] ABSTRACT

A seat belt operation detector includes a first detector means for actuating at the time of sitting on a seat and a second detector means for actuating at the time of connecting of a seat belt. A flip-flop circuit responds to signals of the first and second detector means such that a normal connecting of the seat belt can be detected only when the signal of the first detector is applied to the flip-flop circuit and then the signal of the second detector is applied to the flip-flop. An alarm is operated or an engine is prevented from being started at abnormal or improper seat belt connecting conditions since the two detector signals will be received in different order or only one of the signals will be received when there is not seat belt use.

4 Claims, 2 Drawing Figures

SEAT BELT OPERATION DETECTOR

BACKGROUND OF THE INVENTION

1. Field of the Invention

This invention relates to a seat belt operation detector for confirming the proper use of a safety seat belt facilitated at each seat.

2. Description of the Prior Art

For purposes of safety in the use of a car, sealt belts are often facilitated in the car. While the use of seat belts has been proven beneficial and are required to be installed in all new cars, their use by all drivers and passengers has not been made and accordingly the effective functions of the seat belts have not been imparted. In order to increase the rate of use of the seat belts, it has been known to provide the alarm of a buzzer informing the driver or passengers when seat belts are not in use.

It has also been known to provide a device which prevents the initiation of the engine when the seat belt is not used.

However, if only the connection of the seat belts is necessary to prevent an alarm signal, then the driver or passenger can avoid using the seat belts by keeping the same always connected. In the past, the confirmation of the safe use of seat belts could therefore not be attained by the conventional devices, since the driver or passengers could easily prevent the alarm signal and circumvent use.

SUMMARY OF THE INVENTION

Accordingly, it is an object of this invention to provide a new and improved unique detector for detecting the normal and proper use of a seat belt by detecting a condition of use of the belt by a driver or passenger by detecting the connecting of the seat belt after the sitting on a seat.

It is another object of this invention to prevent the starting of an engine by detecting the non-use of a seat belt by a driver or passenger after sitting on a seat.

It is still another object of this invention to provide a new and improved unique seat belt operation detector for preventing the starting of an engine by opening the alerting or readying circuit of the engine when the seat belt is not used by the driver or passenger.

It is yet another object of this invention to detect a condition of normal use of the seat belt even when a seat switch is chattered by jumping or the like after a driver or passenger is seated.

The foregoing and objects of this invention have been attained by providing a seat belt operation detector which includes a seat switch for applying a first input to a flip-flop circuit by turning on when a driver or passenger sits on a seat and a belt switch for applying a second input to the flip-flop circuit by turning on when the seat belt is connected. The output voltage of the flip-flop circuit results in zero when the second input is received by the flip-flop circuit after receiving the first output. A switching element is connected to the output terminal of the flip-flop circuit, so that when an output voltage is applied from the flip-flop circuit, the switching element is turned on and an alerting circuit of an engine is opened by operation of a relay to prevent a starting of the engine or to sound an alarm.

BRIEF DESCRIPTION OF THE DRAWINGS

A more complete appreciation of the invention will be readily obtained as the same becomes better under understood by reference to the following detailed description when considered in connection with the accompanying drawings wherein.

DETAILED DESCRIPTION OF THE PREFERRED EMBODIMENTS

Figure 1:
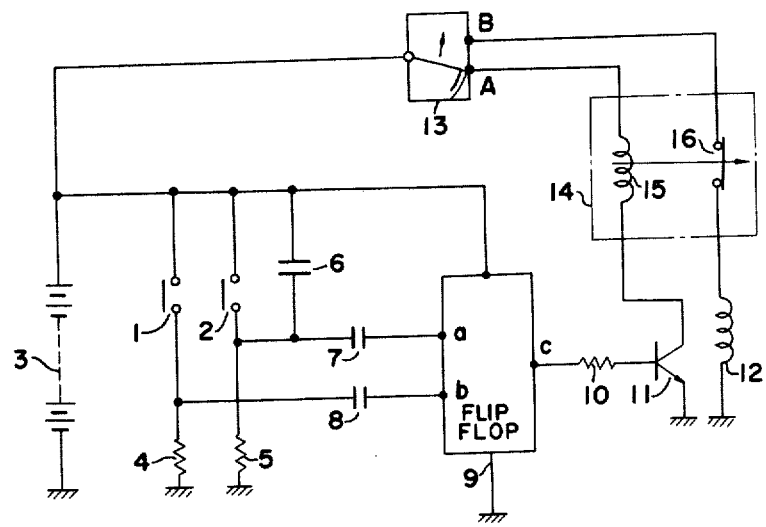
FIG. 1 is a diagram of an electrical circuit of a preferred embodiment of the detector of this invention.

Referring now to the drawings, a preferred embodiments of the invention is illustrated.

In FIG. 1 the reference numeral 1 designates a belt switch for detecting a connection of the seat belt and 2 designates a seat switch for detecting the seating of a driver or passenger. The numeral 3 designates a power source such as a battery; 4 and 5 designate resistors; 6, 7 and 8 designate condensers and 9 designates a conventional flip-flop circuit. The numeral 10 designates a resistor; 11 designates a transistor; 12 designates a starter switch coil of a car; 13 designates a key switch; A is an ignition terminal and B is a starter terminal; 14 designates a relay and 15 designates a relay coil and 16 designates a relay contact.

The operation of the embodiment set forth above is as follows. Flip-flop circuit 9 is a memory circuit having input terminals a, b and an output terminal c. When the seat switch 2 is turned on by the seating of a driver or passenger, the input terminal a is triggered positive, through the condenser 7, so that substantially the same voltage as that of the power source 3 is applied to the output terminal c. When the belt switch 1 is turned on by connecting the belt, the input terminal b is triggered positive through the condenser 8, such that a zero potential relative to the power source is provided at the output terminal c. The seat belt is actually used in said condition.

It should be understood that initially the output terminal c of the flip-flop circuit 9 is at a zero potential before the seat switch 2 and the belt switch 1 are turned on. If the belt switch 1 is turned on in opposite order, namely, before the seat switch is activated then a zero potential will be provided at the output of the output terminal c. Accordingly, when the seat switch 2 is subsequently turned on, a voltage nearly the same as the power source voltage will be applied to the output terminal c.

As stated above, when the belt switch 1 is turned on after turning on the seat switch 2, a zero potential will be provided at the output terminal c of the flip-flop circuit 9. However, when the seat switch 2 is turned on after turning on the belt switch 1, the power source voltage will be applied to the output terminal c. Moreover, when the seat switch 2 is turned on and the belt switch 1 is turned off, a voltage nearly the same as the power source will be applied to the output terminal c.

As stated above, when a driver or passenger is seated and nearly the power source voltage is applied to the output terminal c, the base current of the transistor 11 will be fed through the resistor 10 so that the transistor 11 will be turned on. Under the condition when the power source voltage is applied to the ignition terminal A of the key switch 13 for readying the engine, the relay coil 15 is driven so that the relay contact 16 which turns on in a normal condition, is turned off. According, even through the power source voltage is applied to the starter terminal B of the key switch 13, the starter switch coil 12 will be shut down by the relay contact 16. Accordingly, the power source voltage is not applied and the starter is not readied for operation. However, when the belt is connected after sitting on a seat, which is the normal seat belt use condition, a zero potential will be applied to the output terminal c, so that the transistor 11 is non-conductive and the relay 14 is not operated and the starter is accordingly properly readied for operation. When the seat switch 2 is turned on after turning on the belt switch 1, nearly the power source voltage will be applied to the output terminal c. In order to have a zero potential at the output terminal, the belt switch 1 must be turned off and then is turned on again. That is, the seat belt must be released and reconnected.

On the other hand, it should be understood that with the present invention erroneous operation of the flip-flop circuit 9 caused by chattering of the seat switch 2 by the jumping of a driver or passenger is prevented by the condenser 6. Accordingly, when the seat switch 2 is turned on before the condenser 6 is fully charged and thus within the charging constant of the condenser 6 which is decided by the capacity of the condenser 6 and resistance 5, the input terminal a of the flip-flop circuit 9 will not be triggered, so as to prevent any affect on operation by the short chattering of the seat switch 2. Accordingly, with the present invention the condenser 6 can be used to effectively eliminate any erroneous seat belt operation by the jumping of a driver or passenger.

Figure 2:
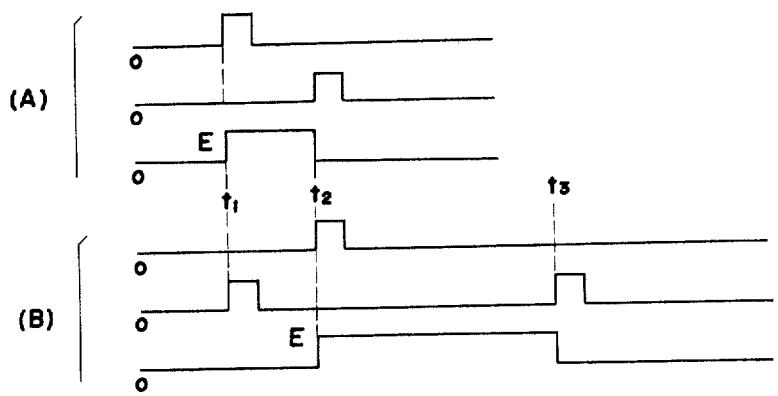
FIG. 2 is a time chart for illustrating the electrical circuit of FIG. 1.

FIG. 2, shows time charts for illustrating the operation of the circuit. FIG. 2 A shows charts for the normal use of a seat belt, that is when the seat belt is connected after sitting on a seat. The three wave forms of FIGS. 2 A and 2 B respectively show the input wave form at the input terminal a of the flip-flop circuit; the input wave form at the input terminal b of the flip-flop circuit and input wave form at the output terminal c of the flip-flop.

FIG. 2 B shows charts for the abnormal use of th seat belt, that is when the seat belt is connected before sitting on a seat. In FIG. 2 A it is seen that when the seat switch 2 is turned on by sitting on the seat at the time $t_1$, the input signal is applied to the input terminal a of the flip-flop circuit, so that the power source voltage E is formed at the output terminal c or the flip-flop circuit. When the belt switch 1 is turned on by connecting the belt at the time $t_2$, the input signal therefrom is applied to the input terminal b to provide a zero potential at the output terminal c. At such time, the transistor of FIG. 1 is turned off and the relay coil 15 is not operated so that the contact 16 of the relay will keep turned on and the starter terminal B will be connected to the starter switch coil 12. Accordingly, when the power source voltage is applied to the starter terminal B, the starter switch coil 12 will operated to alert the starter for proper use. In FIG. 2 B it is een that when the belt is connected at the time $t_1$, a zero potential is provided at the output terminal c. However, when a driver or passenger subsequently sits on a seat at the time $t_2$, the power source voltage E is applied to the output terminal c. The starter is thereby not alerted or readied and the engine is not started. Once, the seat belt is disconnected and then the seat belt is connected at the time $t_3$, a zero potential will be provided at the output terminal c, so that the starter can be alerted.

In general, the electric apparatus of a car need not be operated when the car is under a non-use condition, and accordingly, the power source is connected to an ignition terminal A of a key switch 13. However, it is necessary to use the power source in the embodiment of this invention before actuating the key switch 13 since the seat belt operation detector is directly connected to the power source 3. Accordingly, it is necessary to minimize power consumption of the detector. It is possible to provide a circuit having substantially no power consumption by using an integrated circuit such as the flip-flop circuit in the above embodiment.

Moreover, the degree of total integration can be increased by using an integrated circuit such as a flip-flop circuit because the flip-flop circuit is used as a memory element.

As stated above, it should now be apparent that in accordance with this invention, a flip-flop circuit is triggered by a signal which detects a sitting condition and a signal which detects a seat belt connection. The fact of connecting the seat belt after seating, can be detected from the output of the flip-flop circuit, so that a proper and normal seat belt use is detected. Accordingly, an actual and proper seat belt operation can be detected without failure with this invention. When a starter of an engine is controlled by the detected output, it is possible to inform the user of seat belts when the driver or passengers are not using the seat belt in normal conditions. In this manner it is hoped that the rate of seat belt use can increase and be effective for safety purposes. In accordance with this invention, the detector can be formed by using a relatively few elements so that an economical and reliable detector can be provided.

Obviously, numerous modifications and variations of the present invention are possible in light of the above teachings. It is therefore to be understood that within the scope of the teachings herein and the appended claims the invention may be practiced otherwise than as specifically described.

What is claimed as new and desired to be secured by letters Patent of the United States is:

1. A seat belt operation detector for a vehicle having an engine comprising:

a seat switch which is normally open but which closes when a seat in the vehicle is occupied, a belt switch which is normally open but which closes when a seat belt in the vehicle is utilized.

a flip-flop having first and second inputs and output and which generates a first predetermined signal from its output when a first signal is applied to its first input and which generates a second predetermined signal from its output when a second signal is applied to its second input, means for starting the vehicle engine responsive to the first predetermined signal to prohibit the engine from starting and responsive to the second predetermined signal to permit the engine to start, means connecting the seat switch between the first input of the flip-flop and a power source, means connecting the belt switch between the second input of the flip-flop and a power source, and means connecting the output of the flip-flop to the means for starting the vehicle engine.

2. A seat belt operation detector for a vehicle having an engine in accordance with claim 1 wherein the means connecting the seat switch between the first input of the flip-flop and a power source comprises a capacitor and wherein the means connecting the belt switch between the second input of the flip-flop and a power source comprises a capacitor.

3. A seat belt operation detector for a vehicle having an engine in accordance with claim 2 wherein a capacitor is connected in parallel with the seat switch.

4. A seat belt operation detector for a vehicle having an engine in accordance with claim 2 wherein the means for starting the vehicle engine comprises a transistor connected to a relay which permits the engine to start when the transistor is not in a conductive state and which prohibits the engine from starting when the transistor is in a conductive state.

* * * * *